United States Patent [19]

Firey

[11] 4,009,694
[45] Mar. 1, 1977

[54] GASOLINE ENGINE TORQUE REGULATOR WITH PARTIAL SPEED CORRECTION

[76] Inventor: Joseph Carl Firey, P. O. Box 254, Northgate Station, Seattle, Wash. 98125

[22] Filed: Apr. 15, 1976

[21] Appl. No.: 677,404

[52] U.S. Cl. .......................... 123/90.12; 123/90.13; 123/90.15; 123/90.16
[51] Int. Cl.² .......................................... F01L 9/02
[58] Field of Search ......... 123/90.12, 90.13, 90.15, 123/90.16

[56] References Cited
UNITED STATES PATENTS

| | | | |
|---|---|---|---|
| 885,459 | 4/1908 | Engler | 123/90.12 |
| 1,763,154 | 6/1930 | Holzwarth | 123/90.12 |
| 1,965,517 | 7/1934 | Vitalini | 123/90.16 |
| 2,065,081 | 12/1936 | Lee | 123/90.12 |
| 2,602,434 | 7/1952 | Barnaby | 123/90.12 |
| 2,615,438 | 10/1952 | Tucker | 123/90.12 |
| 3,257,999 | 6/1966 | Fiedler | 123/90.12 |
| 3,518,976 | 7/1970 | Thuesen | 123/90.16 |
| 3,612,015 | 10/1971 | Hausknecht | 123/90.12 |
| 3,738,337 | 6/1973 | Massie | 123/90.12 |
| 3,817,228 | 6/1974 | Bywater | 123/90.16 |

*Primary Examiner*—C. J. Husar
*Assistant Examiner*—Daniel J. O'Connor

[57] ABSTRACT

The gasoline engine torque regulator described herein provides means of reducing the quantities of harmful oxides of nitrogen emitted via the exhaust of a four stroke cycle gasoline engine and also of increasing the efficiency of the engine at part load, with an engine torque characteristic either approximately constant with engine speed or alternatively controllably decreasing with increasing engine speed. These beneficial objects are achieved by adjustably delaying the closing of the engine intake valve as a means of controlling the engine torque, the opening of the intake valve remaining fixed. This manner of intake valve opening and closing can be achieved by adding to the conventional intake valve operating mechanism a dashpot device with a check valve and a positive displacement flow regulator. The check valve allows ready flow of the dashpot fluid between dashpot chambers when the intake valve is being opened but closes and forces fluid to flow oppositely, during intake valve closing, at least partially via the positive displacement flow regulator which proportions the flow and hence the rate of valve closure to the speed of the engine. With intake valve closing thereby delayed, a portion of the air-fuel mixture, drawn into the engine cylinder during the intake stroke, is pushed back into the intake manifold during the compression stroke. As a result less air-fuel mixture remains in the engine cylinder and the engine torque is reduced, the extent of such torque reduction increasing as the intake valve closing is longer delayed. The engine compression ratio is reduced at reduced torque and, in consequence, gas temperatures during compression, combustion and expansion are reduced, producing a beneficial decrease in the quantities of oxides of nitrogen formed and subsequently emitted. Part load efficiency of the engine is increased because pumping work is essentially eliminated.

4 Claims, 4 Drawing Figures

GASOLINE ENGINE TORQUE REGULATOR WITH PARTIAL SPEED CORRECTION

CROSS REFERENCES TO RELATED APPLICATIONS

This invention is a modification of the invention described in my earlier application entitled, "Gasoline Engine Torque Regulator,"U.S. Pat. No. 3,938,483. The modification consists principally in providing means to proportion the rate of valve closing to the speed of the engine. This invention is also related to my recently filed application entitled, "Gasoline Engine Torque Regulator With Speed Correction," Ser. No. 654,572, filing date, 2 Feb. 1976.

BACKGROUND OF THE INVENTION

1. Field of the Invention

This invention pertains to the field of four stroke cycle gasoline engines and specifically the field of means of regulating the torque of such engines by delaying the time of intake valve closing so as to achieve an approximate Atkinson cycle at part load in lieu of the conventional Otto cycle, as achieved by the use of an intake throttle for torque regulation.

2. Description of the Prior Art

The essential prior art is presented in the earlier application cross referenced above. When a dashpot is used, as described therein, to adjustably delay intake valve closure the engine torque will rise at fixed torque control setting when engine speed decreases. This engine characteristic of rising torque with decreasing speed is desirable in certain engine uses as for example, in earthmoving or agricultural machinery. In other engine uses, as for example, passenger automobile drives, such an engine torque characteristic is undesirable. For passenger automobile engines a constant torque or only slightly rising torque with decreasing speed is preferred as being the engine torque characteristic to which passenger car drivers are accustomed.

The gasoline engine torque regulator, described in the earlier application cross referenced above, connects a piston and cylinder dashpot between the engine intake valve and the engine frame. This dashpot is fitted with a check valve flow passage which opens fully during valve opening to allow free flow of dashpot fluid between chambers when the engine intake valve is being opened by the intake cam and valve linkage. When the engine intake valve is being closed by the action of the intake valve spring the check valve closes and return flow of dashpot fluid then takes place via an adjustable restricted flow passage. In this way the closing of the engine intake valve may be adjustably delayed, by adjustment of the restriction in the restricted flow passage, beyond the usual intake valve closing time of at or near piston bottom dead center. As intake valve closing is longer delayed an increasing portion of the air-fuel mixture drawn into the engine cylinder during the intake stroke is pushed back into the intake manifold as the piston rises during the compression stroke. The amount of air-fuel mixture thusly returned to the intake manifold is proportional to the delay of intake valve closure beyond piston bottom dead center expressed in engine crankshaft degrees or, equivalently, expressed in percent of piston return stroke. Hence engine torque, which is proportional to the amount of air-fuel mixture left in the engine cylinder at intake valve closure, must decrease in proportion to the crankshaft degrees of delay of such valve closure. Since the dashpot devices of my earlier referenced application delay intake valve closure by a fixed time interval, at any one setting of the flow restriction, engine torque must increase as engine speed decreases since the delay interval in crankshaft degrees is necessarily decreased thereby.

SUMMARY OF THE INVENTION

A first principal object of this invention is to modify the dashpot device of the earlier cross-referenced application so that engine torque remains constant or nearly constant when engine speed changes at fixed setting of the torque regulator. This type of engine torque characteristic is preferred in certain uses of gasoline engines, as, for example, automobile uses. This first object is accomplished by replacing the adjustable flow restrictor of the earlier cross-referenced application with a fixed stroke, positive displacement flow regulator actuated in proportion to engine speed. A second principal object of this invention is to modify the dashpot device of the earlier cross-referenced application so that the engine torque characteristic can be adjusted anywhere between constant torque with increasing engine speed to sharply decreasing torque with increasing engine speed. This second object is accomplished by placing a fixed stroke, positive displacement flow regulator, actuated in proportion to engine speed, in parallel flow with the adjustable flow restrictor of the earlier cross-referenced application and disconnecting the torque control linkage from said adjustable flow restrictor. Said fixed stroke, positive displacement flow regulator allows a fixed number of fluid portions to pass from one dashpot chamber to the other within a fixed angle of engine crankshaft rotation, the volume of each such portion being adjustable by adjustment of the ports of the positive displacement flow regulator, such adjustment of ports being the means of regulating the engine torque.

Other beneficial objects of this invention are the same as those described in detail in the earlier referenced application and include the following beneficial objects:

1. Reduction of exhaust emissions of undesirable oxides of nitrogen at part load by reduction of average and maximum combustion temperatures.
2. Reduction of exhaust emissions of undesirable carbon monoxide and unburned hydrocarbons by minimizing liquid fuel fraction maldistribution between the cylinders of a multicylinder engine.
3. Improvement of engine efficiency at part load by essentially eliminating the pumping work of the intake and exhaust processes of a four stroke cycle gasoline engine.

These latter beneficial objects are achieved by the same means as described in the earlier referenced application.

Figure 1:
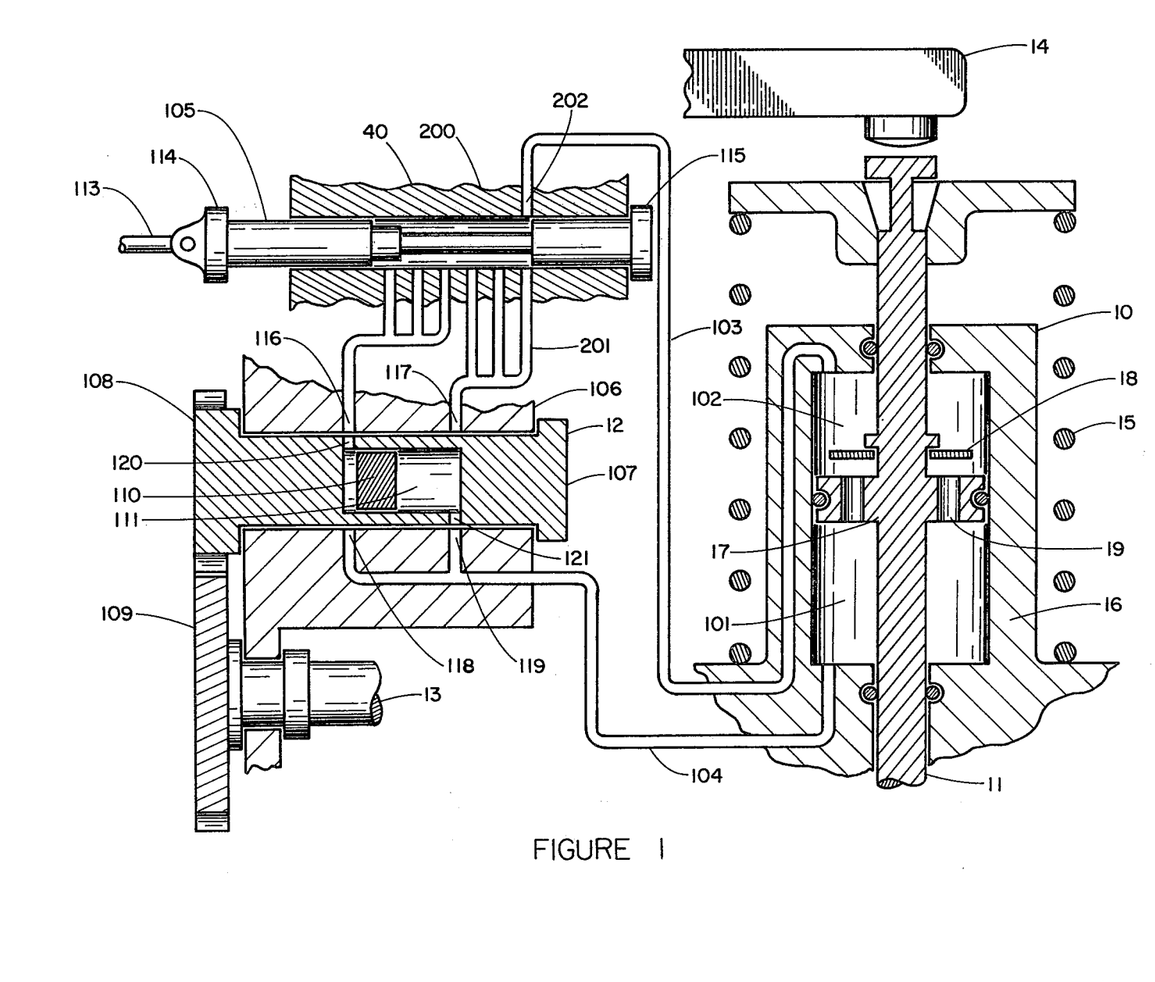
In FIG. 1 is shown one assembly arrangement of a dashpot element, 10, to an intake valve, 11, of a gasoline engine with a fixed stroke, positive displacement flow regulator, 12, driven from an engine shaft, 13, such as the engine camshaft or crankshaft.

DETAILED DESCRIPTION OF THE INVENTION:

One preferred form of the invention is shown in FIG. 1 connected to a dashpot element, 10, which connects in turn to an engine intake valve, 11, said engine intake valve, 11, being actuated by the usual intake valve rocker arm, 14, or other final portion of the usual intake valve operating cams and linkage, and the usual intake valve closing spring, 13. The intake valve operating cams and linkage, including the rocker arm, 14, the intake valve closing spring, 15, and the engine intake valve, 11, are all parts of a conventional, four stroke cycle, gasoline engine whose other necessary operative portions, such as, cylinders, pistons, connecting rods, crankshafts, camshafts and camshaft drive gear, exhaust valves, etc., are not shown in the Figures and are already well known in the art of gasoline engines. The dashpot, 10, including the component parts, dashpot cylinder, 16, dashpot piston, 17, one way check valve, 18, and check valve flow passage, 19, are similar to the corresponding component parts described in the cross referenced earlier application. The operation of an engine intake valve equipped with such a dashpot is as follows. At the usual intake valve opening time of at or near engine piston top dead center at the start of the intake stroke, the intake valve cam moves the linkage, 14, to positively open the intake valve, 11, and the one way check valve, 18, opens fully allowing free flow of dashpot fluid through the check valve flow passages, 19, from the valve side, 101, of the piston, 17, to the rocker arm side, 102. Hence the opening of the engine intake valve is not affected by the dashpot element. At the usual intake valve closing time of at or near engine piston bottom dead center at the end of the intake stroke, the intake valve cam moves the linkage, 14, away from the intake valve, 11, in the closing direction and the engine intake valve, 11, is forced in the closing direction by the force of the intake valve closing spring, 15. The one way check valve, 18, then closes off the check valve flow passages, 19, and the dashpot fluid can only return from the rocker arm side, 102, of the dashpot piston, 17, to the valve side, 101, via the control passages, 103 and 104. Hence the rate of closing of the engine intake valve can be determined by the rate of flow of dashpot fluid through the control passages provided such rate of flow allows the engine intake valve to close more slowly than does the intake valve cam and linkage. The engine intake valve cannot close more quickly than allowed by the intake valve cam and linkage but can be closed adjustably more slowly by adjusting the rate of flow of the dashpot fluid through the control passage. In the earlier cross referenced application such adjustment of the rate of flow of the dashpot fluid was accomplished by placing in the control passage an adjustable flow restrictor such as a needle valve or viscous restrictor. These latter kinds of adjustable flow restrictor set a fixed time duration of intake valve closing for each setting of the flow restrictor. In consequence the engine crank angle duration of intake valve closing, and correspondingly the percent of piston return stroke during which the intake valve remains open, increases as engine speed increases. Thus at any fixed setting of such an adjustable flow restrictor the engine torque will decrease as engine speed is increased since engine torque is proportional to the amount of air-fuel mixture left inside the engine cylinder when the intake valve finally closes and this mixture amount necessarily decreases as the duration of the intake valve closing, as a percent of piston return stroke, is increased by increase of engine speed. Such an engine torque characteristic of sharply decreasing torque with increasing speed and rising torque with decreasing speed is suitable for certain gasoline engine uses, such as to earthmoving machines, but is less suitable for other gasoline engine uses, such as to passenger automobiles where a nearly constant torque with change of engine speed is preferred as being the torque characteristic to which automobile drivers have been long accustomed. For still other gasoline engine uses, such as medium and heavy trucks, an intermediate torque characteristic is desired.

A first principal object of this invention is to make available the several beneficial objects of the earlier cross referenced application for a gasoline engine having a nearly constant torque with change of engine speed. This first principal object of this invention is achieved by removing the adjustable flow restrictor from the control passage and placing therein, in its stead, a fixed stroke, positive displacement flow regulator, whose design and operation are described hereinafter, so that dashpot fluid returns during valve closing from the rocker arm side, 102, of the dashpot piston, 17, to the valve side, 101, only via the positive displacement flow regulator, 12.

A second principal object of this invention is to make available the several beneficial objects of the earlier cross referenced application for a gasoline engine whose torque characteristic can be changed to a constant torque with changing engine speed or to a sharply decreasing torque with increasing engine speed or to any torque characteristic between these two. This second principal object of this invention is achieved by placing a fixed stroke, positive displacement flow regulator, as described hereinafter, in parallel flow with the adjustable flow regulator of the earlier referenced application so that dashpot fluid returns during valve closing from the rocker arm side, 102, of the dashpot piston, 17, to the valve side, 101, via both the aforementioned adjustable flow restrictor and, in parallel therewith, the fixed stroke, positive displacement flow regulator. The torque control linkage is disconnected from the adjustable flow restrictor and connected instead to the port regulator element, 40, of the fixed stroke, positive displacement flow regulator.

The fixed stroke, positive displacement flow regulator, 12, comprises the following elements: a fixed port element, 106, within which rotates a rotating port element, 107, driven positively, as by gears, 108 and 109, or chain or timing belt, from the engine camshaft 13, or crankshaft; a free piston element, 110, moveable within a closed end cylinder, 111, whose available stroke within said cylinder is fixed and whose maximum active displacement volume is VP; a port regulator element, 40, connected in series flow with the fixed port element, 106, the rotating port element, 107, and the free piston element, 110, and containing a moveable regulator bar, 105; said moveable regulator bar, 105, being connected to the engine torque control linkage, 113, and being fitted with two control stops, 114 and 115, which limit the range of adjustment of the moveable regulator bar, 105, by the torque control linkage, 113. The fixed port element, 106, contains four sets of fixed ports, two sets of pressure fixed ports, 116 and 117, and two sets of discharge fixed ports, 118 and 119. Each pressure fixed port of the two sets of pressure fixed ports, 116 and 117, connects separately to a cavity port, 201, in the stationary cavity port housing, 200, the number of cavity ports, 201, being equal to the number of pressure fixed ports, 116 and 117, with one extra pressure cavity port, 202, connecting instead to one portion, 103, of the control passage which connects into one end of the dashpot cylinder, 16. The two sets of discharge fixed ports, 118 and 119, connect together to a portion, 104, of the control passage which connects into the other end of the dashpot cylinder, 16. One set of pressure fixed ports, 116, is coplanar with one set of discharge fixed ports, 118, in a plane normal to the axis of rotation of the rotating port element, 107, and these fixed ports are also coplanar with one moving port, 120, in the rotating port element. The other set of pressure fixed ports, 117, is coplanar with the other set of discharge fixed ports, 119, in another plane normal to the axis of rotation of the rotating port element, 107, and these latter fixed ports are also coplanar with the other moving port, 121, in the rotating port element.

The moving port, 120, indexes alternately with those pressure fixed ports, 116, and those discharge fixed ports, 117, with which it is coplanar. The moving port, 121, indexes alternately with those discharge fixed ports, 119, and those pressure fixed ports, 117, with which it is coplanar. When the moving port, 120, is indexed with a pressure fixed port, 116, the other moving port, 121, is indexed with a discharge fixed port, 119. Subsequently the moving port, 120, will next index with a discharge fixed port, 118, and the other moving port, 121, will simultaneously next index with a pressure fixed port, 117. One method of obtaining this pattern of indexing between the moving ports and the fixed ports is as follows. An integral odd number of pressure fixed ports is contained in each of the two sets of pressure fixed ports, this odd number of pressure fixed ports in each coplanar set are angularly displaced relative to each other about the axis of rotation of the rotating port element, 107. The number of discharge fixed ports in each set of the two sets of discharge fixed ports is equal to the number of pressure fixed ports with which they are coplanar and this odd number of discharge fixed ports in each coplanar set are angularly displaced relative to each other about the axis of rotation of the rotating port element, 107, so that each discharge fixed port is displaced 180 degrees from one of the coplanar pressure fixed ports about said axis of rotation. Each pressure fixed port of one coplanar set of pressure and discharge fixed ports is angularly displaced from one discharge fixed port of the other coplanar set of pressure and discharge fixed ports by the displacement angle between the rotating ports. Said displacement angle is the angle between one moving port, 120, and the other moving port, 121, measured in the direction of rotation of the rotating port element, 107, and about the axis of rotation of said rotating port element.

Figure 2:
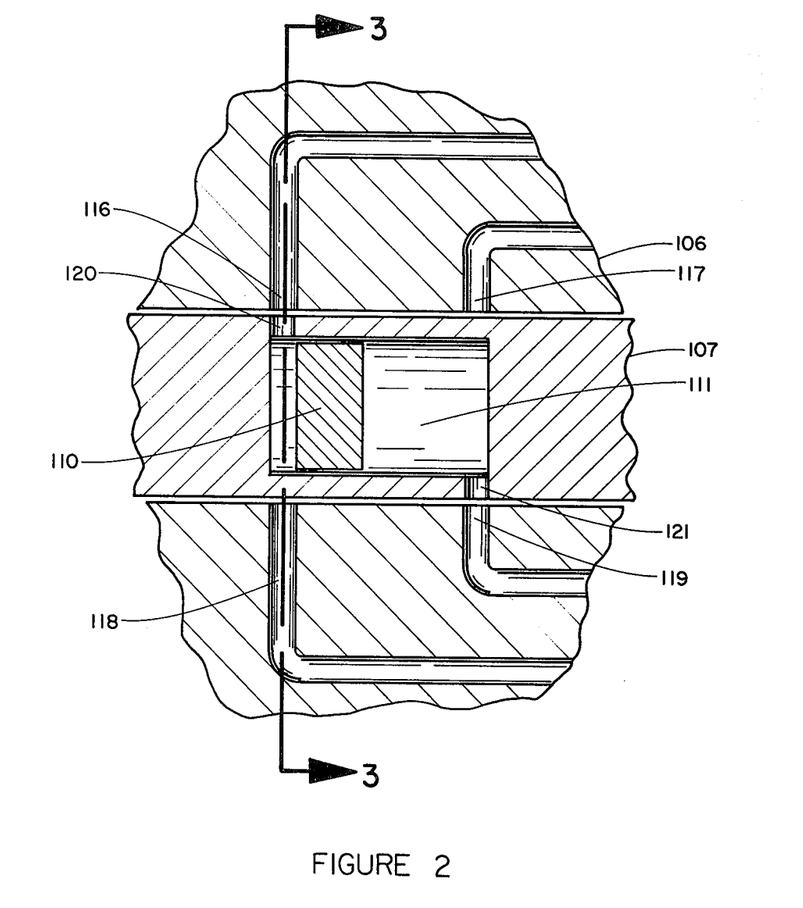
In FIG. 2 is shown, in greater detail, a rotating port element, 107, a fixed port element, 106, a free piston element, 110, of a fixed stroke, positive displacement flow regulator, 12.
Figure 3:
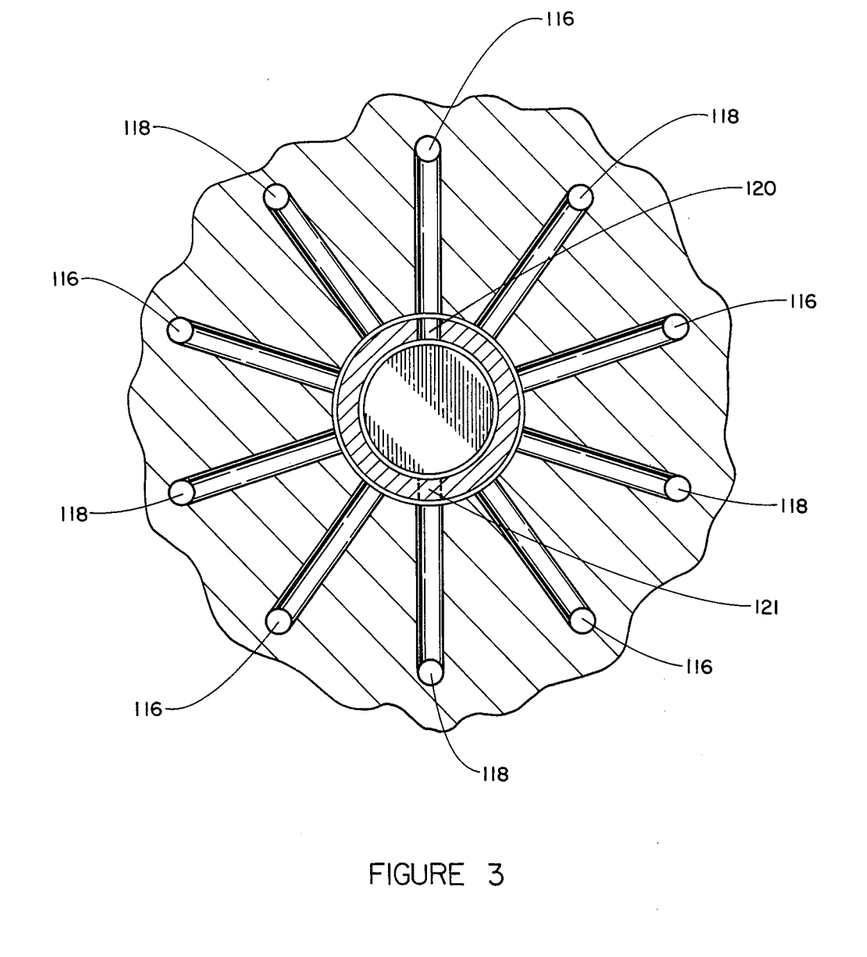
In FIG. 3 is shown the cross sectional view, 3—3, of FIG. 2, to illustrate one arrangement of some of the fixed ports, 116, and the moving ports, 120, of a fixed stroke, positive displacement flow regulator, 12.

One moving port, 120, connects always into one end of the closed end cylinder, 111, and thus to one side of the free piston, 110, whereas the other moving port, 121, connects always into the other end of the closed end cylinder, 111, and thus to the other side of the free piston, 110. In FIGS. 1, 2 and 3 the free piston, 110, and its closed end cylinder, 111, are shown contained within the rotating port element, 107, but this is not necessary and the free piston and its cylinder can be separate and non rotating provided that the moving ports connect thereto as described above.

An example of an arrangement of fixed and moving ports fulfilling the foregoing requirements is shown in FIGS. 2 and 3, FIG. 3 being the cross section, 3—3, of FIG. 2 to show an angular distribution of one set of coplanar pressure fixed ports, 116, and the coplanar set of discharge fixed ports, 118, and of the moving ports, 120, and 121. The five coplanar pressure fixed ports, 116, are uniformly displaced angularly by 72° about the axis of rotation of the rotating port element, 107, as are also the five coplanar discharge fixed ports, 118, and these latter are angularly displaced by 36° from the coplanar pressure fixed ports, 116. The moving ports, 120 and 121, are separated angularly about the axis of rotation of the rotating port element, 107, by a displacement angle of 180°. Hence the other coplanar set of pressure fixed ports, 117, and discharge fixed ports, 119, are disposed angularly about the axis of rotation of the rotating port element, 107, in exactly the same alignment as shown in FIG. 3. Thus when the moving port, 120, is indexed with the pressure fixed port, 116, the moving port, 121, is indexed with a discharge fixed port, 119, as shown in FIGS. 3 and 2.

Figure 4:
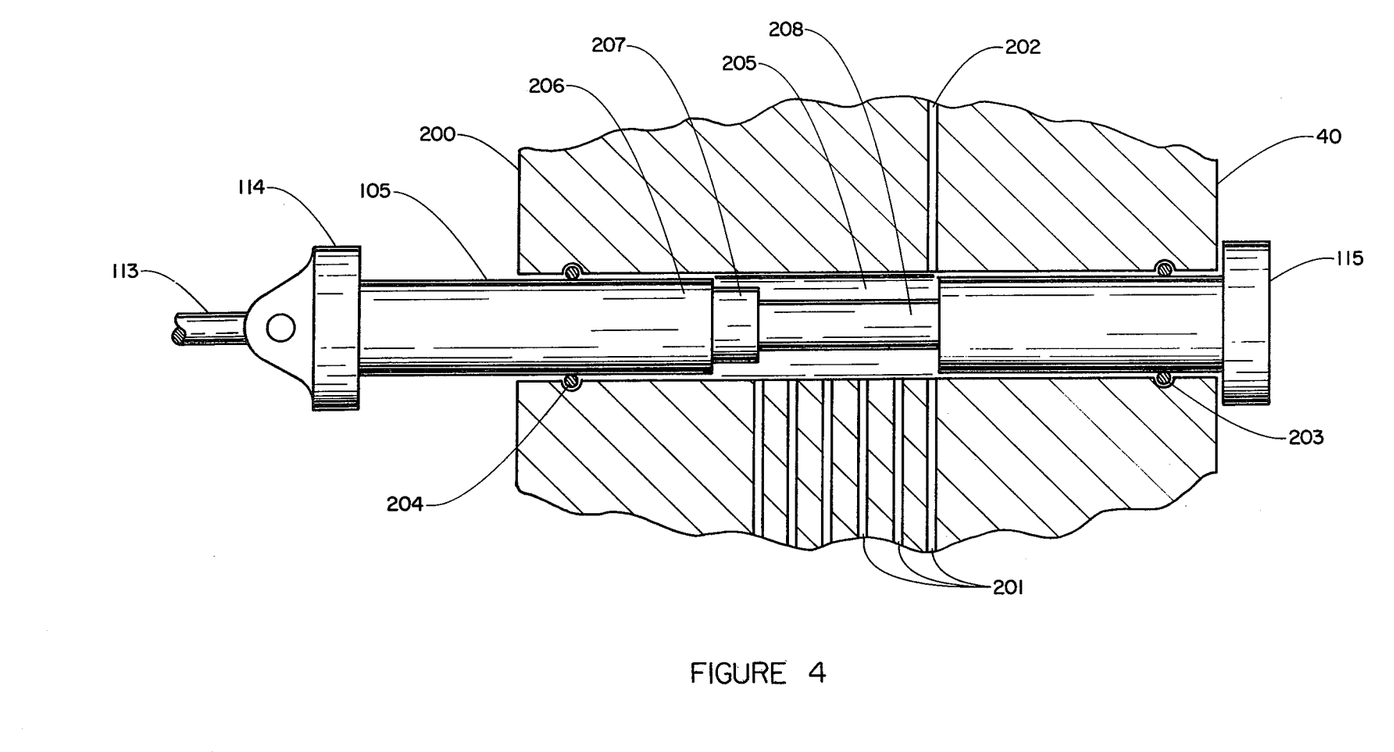
In FIG. 4 is shown one form of port regulator element, 40, which is shown in series flow with the fixed port element, 106, the rotating port element, 107, and the free piston element, 110, in FIG. 1.

One form of port regulator element, 40, is shown in greater detail in FIG. 4 and comprises the moveable regulator bar, 105, fit sealably and moveably into the port cavity, 205, of the stationary cavity port housing, 200. The moveable regulator bar, 105, is connected to and moveable by the engine torque control linkage, 113, and is fitted with two control stops, 114 and 115, which limit the range of motion of the moveable regulator bar, 105. The full control stop, 115, positions the moveable regulator bar, 105, so that the sealing portion, 206, and the restrictor portion, 207, do not seal off or cover any of the cavity ports, 201. The idle control stop, 114, positions the moveable regulator bar, 105, so that the sealing portion, 206, seals off at most all of the cavity ports, 201, except one, and this one is also not covered by the restrictor portion, 207. The pressure cavity port, 202, and at least one of the cavity ports, 201, are thus always unsealed and unrestricted. The sealing portion, 206, of the moveable regulator bar, 105, is fit sufficiently closely to the port cavity, 205, that whenever a cavity port, 201, is covered by this sealing portion, 206, dashpot fluid is effectively stopped from flowing through that cavity port and hence also from flowing through that pressure fixed port, 116 or 117, to which that cavity port is connected. The restrictor portion, 207, of the moveable regulator bar, 105, is fit less closely to the port cavity, 205, and hence when a cavity port, 201, is covered by this restrictor portion dashpot fluid can flow through that cavity port and also its connected pressure fixed port but the rate of such flow of dashpot fluid is slowed up by the restriction of the restrictor portion, 207. The axial length of the restrictor portion, 207, in the direction of motion of the moveable regulator bar, 105, is preferably at least equal to the axial distance between cavity ports, 201. The recessed portion, 208, of the moveable regulator bar, 105, is appreciably smaller than the port cavity, 205, and hence when a cavity port, 201, is covered by this recessed portion dashpot fluid can flow readily through that cavity port and also its connected pressure fixed port without significant restriction. The axial length of the recessed portion, 208, in the direction of motion of the moveable regulator bar, 105, is sufficient to cover all of the cavity ports, 201, together with the pressure cavity port 202, when the moveable regulator bar is positioned by the full control stop, 115. The cavity ports, 201, can be set in a straight line as shown in FIG. 4 or alternatively can be distributed angularly about the port cavity, 205, as well as axially along the port cavity. Additional seals, 203 and 204, such as "O"ring seals can be used, if desired, to deter leakage of dashpot fluid past the moveable regulator bar, 105.

The operation of the particular form of this invention shown in FIGS. 1, 2, 3 and 4 can be described as follows during the closing of the engine intake valve, 11. At the usual intake valve closing time of engine piston at or near bottom dead center at the end of the intake stroke, the intake valve cam moves the rocker arm, 14, away from the engine intake valve, 11, and the valve spring, 15, applies a force to the valve, 11, in a direction to close the valve, 11. As the engine intake valve, 11, commences to close the one way check valve, 18, closes and, as a result, the force of the valve spring, 15, acts via the dashpot piston, 17, to create a pressure in the dashpot fluid contained in the rocker arm end, 102, of the dashpot cylinder, 16. This dashpot fluid pressure acts via the control passage connection, 103, at the pressure cavity port, 202, and thence at such of the cavity ports, 201, as are not covered by the sealing portion, 206, of the moveable regulator bar, 105, and thus also at such of the pressure fixed ports, 116 and 117, as are connected to these unsealed cavity ports, 201. When the moving port, 120, indexes with a pressure fixed port, 116, whose connected cavity port is neither sealed by the sealing portion, 206, nor restricted by the restrictor portion, 207, of the moveable regulator bar, 105, this dashpot fluid pressure forces the free piston, 110, to move away from the moving port, 120, and such motion of the free piston, 110, will continue until the piston, 110, comes to rest against the end of the cylinder, 111. During this motion of the free piston, 110, the other moving port, 121, was indexed with a discharge fixed port, 119, and the dashpot fluid on that side of the free piston, 110, toward the moving port, 121, will move via the control passage connection, 104, into the valve side, 101, of the dashpot cylinder, 16. As a result of this single motion of the free piston, 110, a net volume of dashpot fluid has been transferred from the rocker arm side, 102, of the dashpot cylinder, 16, to the valve side, 101, and the intake valve, 11, can thus move in the closing direction an amount equal to the ratio of the transferred volume to the effective area of the dashpot piston, 17. The net volume of dashpot fluid thus transferred for a single motion of the free piston, 110, is equal to the product of the effective area of the free piston, 110, times the length of stroke allowed to the free piston. The continued rotation of the rotating port element, 107, causes the moving port, 121, to next index with a pressure fixed port and the moving port, 120, to simultaneously next index with a discharge fixed port and, if this pressure fixed port also connects to an unsealed and unrestricted cavity port, 201, the free piston, 110, is moved by the dashpot fluid pressure away from the port, 121, and toward the port, 120, until the free piston, 110, comes to rest against the other end of the cylinder, 111. This return motion of the free piston, 110, has again caused the transfer of the same net volume of dashpot fluid from the rocker arm side, 102, to the valve side, 101, of the dashpot cylinder, 16. When, however, the moving port, 120 or 121, indexes with a pressure fixed port, 116, or 117, whose connected cavity port, 201, is covered and hence sealed by the sealing portion, 206, of the moveable regulator bar, 105, no flow of dashpot fluid can occur and no motion of intake valve closure takes place during such port indexing. Nor will flow of dashpot fluid and motion of intake valve closure occur during the next subsequent indexing of a moving port, 121 or 120, with a pressure fixed port, 117 or 116, since the piston, 110, will be at the wrong end of the cylinder, 111, for flow of dashpot fluid to occur. When, alternatively, the moving port, 120 or 121, indexes with a pressure fixed port, 116 or 117, whose connected cavity port, 201, is covered and hence flow restricted by the restrictor portion, 207, of the moveable regulator bar, 105, flow of dashpot fluid occurs but is restricted in rate and volume and, as a result, the free piston, 110, makes a displacement stroke of incomplete length and the consequent motion of the intake valve, 11, in a closing direction is smaller than when the cavity port, 201, is unsealed and unrestricted. Nor will a complete stroke length of the free piston, 110, occur during the next subsequent indexing of a moving port, 121 or 120, with a pressure fixed port, 117 or 116, since the piston stroke length then available in the reverse direction cannot exceed that of the previous piston stroke. In this way, the back and forth motion of the free piston, 110, caused by successive indexings of the moving ports, 120 and 121, resulting from rotation of the rotating port element, 107, causes the engine intake valve, 11, to close in a series of steps. The size of each such step of intake valve closure may vary from a full step, when the free piston, 110, makes a full stroke with the indexed cavity port, 201, unsealed and unrestricted, through a partial step, when the free piston, 110, makes an incomplete stroke with the indexed cavity port, 201, restricted, to no step, when the free piston, 110, makes no stroke with the indexed cavity port, 201, sealed. Since the engine intake valve, 11, has a fixed distance to move from fully open to fully closed, the total number of indexings of moving ports, 120 and 121, with pressure fixed ports, 116 and 117, required to close the engine intake valve can be increased by sealing off more of the cavity ports, 201, by moving the moveable regulator bar, 105, so as to close the gap between the idle control stop, 114, and the stationary cavity port housing, 200. When the total number of port indexings is thusly increased so also increased are the number of degrees of camshaft and crankshaft rotation needed to close the engine intake valve and thus the engine piston position at which the engine intake valve closes fully is made later during the compression stroke with the result that less air-fuel mixture remains inside the engine cylinder at intake valve closure and the engine torque is decreased. Engine torque may thus be decreased by moving the moveable regulator bar, 105, via the engine torque control linkage, 113, in the above described direction to close the gap between the idle control stop, 114, and the stationary cavity port housing, 200, and increased by moving the moveable regulator bar, 105, oppositely.

Were the moveable regulator bar, 105, to be fitted only with a sealing portion, 206, and have no restrictor portion, 207, the variation of eninge torque with position of the moveable regulator bar, 105, would occur in sharp steps, the torque only changing when a cavity port, 201, was uncovered or covered by said sealing portion. At any one position of the moveable regulator bar, 105, engine torque would be essentially independent of engine speed since the angle of crankshaft rotation needed to close the engine intake valve would remain constant and thus the engine piston position at intake valve closure would also remain constant with the result that the volume of air-fuel mixture remaining inside the cylinder remains likewise constant. It is the function of the restrictor portion, 207, of the moveable regulator bar, 105, to smooth out these steps of engine torque variation with positioning of the moveable regulator bar, 105, by the engine torque control linkge, 113. When the restrictor portion, 207, of the moveable regulator bar, 105, has just started to cover a cavity port, 201, the flow of dashpot fluid through that cavity port is only slightly restricted and the free piston, 110, can make an almost complete stroke. When, however, this cavity port is covered by a greater length of the restrictor portion, the flow of dashpot fluid is more greatly restricted and the stroke length of the free piston is appreciably less than complete and hence the corresponding step of intake valve closure is shorter. In this way the change of engine torque with movement of the moveable regulator bar, 105, is made gradual as is usually preferred for most engine uses. Since the restriction of dashpot fluid flow depends upon both the length of restrictor portion covering a cavity port and the flow area between the restrictor portion, 207, and the port cavity, 205, the manner of variation of engine torque between port sealings with movement of the moveable regulator bar, 105, can be designed by design of the shape of the restrictor portion, 207. In general, a smoother torque variation will result if the restrictor portion tapers outward toward the sealing portion. This control of torque variation by the restrictor portion, 207, varies with engine speed since the rate of flow of dashpot fluid through those cavity ports, 201, covered by the restrictor portion is independent of engine speed. Thus as engine speed increases at a fixed setting of the moveable regulator bar, 105, those free piston strokes caused by port indexings with such flow restricted cavity ports will shorten as will the corresponding step of intake valve closure and engine torque will decrease somewhat. It is in this way that the devices of this invention are only partially compensating of engine torque variation with engine speed. The fewer the number of cavity ports, 201, covered by the restrictor portion, 207, the smaller becomes the above variation of engine torque with engine speed and for this reason it is preferable that the length of the restrictor portion not exceed the axial distance between cavity ports, 201. It is in this way that the first principal beneficial object of this invention is achieved, to make available the several beneficial objects of the earlier cross referenced application with an engine torque characteristic approximately constant with engine speed at any setting of the torque control linkage, 113.

So that the full torque capability of the engine can be realized, the maximum stroke of the free piston, 110, and the total number of pressure fixed ports, 116 and 117, should be sufficient to allow the engine intake valve, 11, to close essentially as rapidly as the intake valve cam will allow when all of the cavity ports, 201, are unsealed and unrestricted with the moveable regulator bar, 105, positioned by the full control stop, 115. This requirement can be met by relating: the displacement volume, VD, of one full stroke of the dashpot element, 10, defined as the product of the effective area of the dashpot piston, 17, times the intake valve lift; the displacement volume of one full stroke of the free piston, VP, defined as the product of the effective area of the free piston, 110, times the maximum available stroke of the free piston; the total number of pressure fixed ports, n, in the fixed port element, 106; the revolutions per minute, NR, of the rotating port element, 107; the revolutions per minute of the engine crankshaft, NE; and the minimum intake valve closing angle, AM, in crankshaft radians; according to the following equation.

$$(VP)(n)(NR/NE)(AM) = 6.283\ (VD)$$

The speed ratio, NR/NE, is determined by the tooth ratio of the gears, 108 and 109, which drive the rotating port element, 107, from the engine camshaft, 13, or engine crankshaft if desired. The minimum intake valve closing angle, AM, should be at least as small as the intake valve closing angle, AC, of the intake cam on the engine camshaft in crankshaft radians, and is preferably less than AC, so that, at full engine torque, the engine intake valve, 11, follows the rocker arm 14, during closure.

The engine intake valve, 11, must eventually close and this should occur prior to the firing of the ignition spark within the engine cylinder to avoid backfiring of the air-fuel mixture. The idle control stop, 114, positions the moveable regulator bar, 105, so that at least one cavity port, 201, is neither sealed nor flow restricted. This requirement to avoid backfiring can be met by determining the displacement volume of one full stroke of the free piston, VP, according to the following equation:

$$(VP)(NR/NE)(AX) = 6.283\ (VD)$$

wherein the maximum intake valve closing angle, AX, is equal to the minimum intake valve closing angle, AM, plus three radians minus the maximum engine ignition spark advance in crankshaft radians before engine piston top dead center.

A multicylinder, four stroke cycle, gasoline engine will require one fixed stroke, positive displacement, flow regulator, as described above, for each cylinder of the engine. It is desirable that the several moveable regulator bars, 105, of these several flow regulators be positioned for equal intake valve closing angle at each setting of the engine torque control linkage, 113, to secure equal work load in each cylinder of the engine. This balanced load condition between engine cylinders can be achieved by fastening all of the several moveable regulator bars together with the same sealing and restricting of the cavity ports and connecting the engine torque control linkage to this assembled multiple moveable regulator bar. Alternatively each of the several moveable regulator bars may be secured individually to the torque control linkage the several moveable regulator bars being secured thusly with the same sealing and restricting of the cavity ports.

To achieve the second principal object of this invention a fixed stroke, positive displacement flow regulator, 12, is connected to a dashpot element, 10, via control passages, 103 and 104, as described above and, additionally the adjustable flow restrictor described in the earlier cross referenced application also connects between the two chambers, 101 and 102, of the dashpot element, 10. Additionally the engine torque control linkage, 113, connects only to the moveable regulator bar, 105, and is disconnected from the adjustable flow restrictor. The adjustment of the adjustable flow restrictor can be set and fixed at any setting between maximum flow restriction and minimum flow restriction and in consequence the engine torque characteristic will correspondingly vary from almost constant torque with changing engine speed to sharply rising torque with decreasing engine speed, as explained hereinafter.

The fixed stroke, positive displacement flow regulator, 12, operates at any one setting of the moveable regulator bar, 105, in the same manner as described hereinabove to allow dashpot fluid to flow from chamber, 102, to chanber, 101, at a rate proportional to engine speed. The adjustable flow restrictor operates, at any one setting thereof, to allow dashpot fluid to flow from chamber, 102, to chamber, 101, at a rate independent of engine speed. Thus, at fixed settings of the moveable regulator bar and the adjustable flow restrictor, as engine speed decreases an increasing portion of the dashpot fluid returns via the adjustable flow restrictor path and the engine intake valve, 11, closes sooner on the engine piston return stroke following the intake stroke. Hence more air-fuel mixture remains inside the engine cylinder at intake valve closure and engine torque is increased as engine speed is decreased. The extent of such torque increases with engine speed decrease can be adjusted by adjustment of the adjustable flow restrictor. At maximum flow restriction of the adjustable flow restrictor, very little of the dashpot fluid returns via the adjustable flow restrictor, most of the dashpot fluid returns via the fixed stroke, positive displacement flow regulator and the engine torque increases very little as engine speed decreases. At minimum flow restriction of the adjustable flow restrictor, an appreciable portion of the dashpot fluid returns via the adjustable flow restrictor, but an appreciable portion of the dashpot fluid still returns via the fixed stroke, positive displacement flow regulator so that torque control can be retained, and the engine torque increases appreciably as engine speed decreases. Thus the variation of engine torque with engine speed may be adjusted between the above limits by adjustment of the adjustable flow restrictor and it is in this way that the second principal object of this invention is achieved.

Having thus described my invention what I claim as new and desire to secure by Letters Patent is:

1. The combination of a four stroke cycle gasoline engine, complete with engine intake valves, intake valve closing springs, intake valve operating cams and linkage, and additionally fitted with a dashpot connecting between each such engine intake valve and the frame of the engine, wherein the improvement comprises connecting the two chambers of each such dashpot together via a fixed stroke, positive displacement flow regulator:

said fixed stroke, positive displacement, flow regulator comprising a fixed port element, a rotating port element and drive, a free piston element, and a port regulator element with torque control linkage;

said fixed port element being secured to the engine frame and containing a cavity, within which the rotating port element rotates, and having two groups of fixed ports; one group of fixed ports, the pressure fixed ports, being connected individually to the port regulator element whose other connection is via a portion of the control passage to that chamber of the dashpot whose volume is decreased when the engine intake valve closes, these pressure fixed ports connecting into the cavity in two sets of pressure fixed ports, each such set being coplanar in a plane at right angles to the axis of rotation of the rotating port element, the plane containing the one set of pressure fixed ports being displaced axially along said axis of rotation from the plane containing the other set of pressure fixed ports by the axial distance separating the two moving ports in the rotating port element as described hereinafter, the pressure fixed ports of each such set being equally angularly displaced relative to each other about said axis of rotation and such that each pressure fixed port of one set is coplanar with a pressure fixed port of the other set in a plane containing said axis of rotation and both these axially coplanar pressure fixed ports are on the same side of the axis of rotation, the number of such pressure fixed ports in each set of the two sets being an integral odd number; the other group of fixed ports, the discharge fixed ports, being connected together and jointly connecting via the other portion of the control passage to that chamber of the dashpot whose volume is increased when the engine intake valve closes, these discharge fixed ports connecting into the cavity in two sets of discharge fixed ports, each such set being coplanar in a plane at right angles to the axis of rotation of the rotating port element, these two planes containing these two sets of discharge fixed ports being coincident with the two planes containing the two sets of pressure fixed ports, the discharge fixed ports of each such set being equally angularly displaced relative to each other and also relative to the coplanar pressure fixed ports about said axis of rotation and such that each discharge fixed port of one set is coplanar with a discharge fixed port of the other set in a plane containing said axis of rotation and both of these axially coplanar discharge fixed ports are on the same side of the axis of rotation, the number of such discharge fixed ports in each set of the two sets being equal to the number of pressure fixed ports with which they are coplanar;

said rotating port element containing a cylindrical cavity for the free piston element and being fitted with two rotating ports connecting to each end of said cylindrical cavity, said rotating port element being positively rotated within the cavity in the fixed port element, as by gears or chains, from an engine shaft such as the crankshaft or camshaft, said rotating port element being closely and sealably fitted to the cavity in the fixed port element; said two rotating ports being jointly coplanar with a plane containing the axis of rotation of the rotating port element and being on opposite sides of said axis of rotation, these two rotating ports being separated from one another along the axis of rotation a distance sufficient to seal them from one another and preferably about the length of the cylindrical cavity; said rotating port element being axially held in alignment within the cavity in the fixed port element so that one of the rotating ports indexes with and is coplanar with one of the sets of pressure fixed ports and also that set of discharge fixed ports which is coplanar therewith, and also so that the other rotating port indexes with and is coplanar with the other set of pressure fixed ports and also that other set of discharge fixed ports which is coplanar therewith;

said free piston element being a piston fitted closely but moveably within the cylindrical cavity in the rotating port element;

said port regulator element comprising a fixed port housing secured to the engine frame and a moveable regulator bar secured to the engine torque control linkage; said fixed port housing containing an open ended cylindrical cavity with cavity ports giving access to and distributed along a portion of the length of said cylindrical cavity, the number of such cavity ports being equal to one more than the number of pressure ports in the fixed port element and each such pressure port being connected individually to one such cavity port, the one extra cavity port not connected to a pressure port being connected via a portion of the control passage to that chamber of the dashpot whose volume is decreased when the engine intake valve closes and being coplanar with that one cavity port which does connect to a pressure port and is never closed by the moveable regulator bar in a plane at right angles to the centerline axis of the cylindrical cavity in the fixed port housing; said moveable regulator bar having two coaxial cylindrical sealing portions whose diameter fits closely, sealably and moveably into the cylindrical cavity in the fixed port housing, a recessed portion whose cross sectional area is less than the cross sectional area of the cylindrical sealing portions by at least the flow area of the cavity ports, a cylindrical restrictor portion whose diameter is smaller than the diameter of the cylindrical cavity by an amount sufficient to prevent sealing therebetween, the axial length of said recessed portion being at least equal to that length of the cylindrical cavity occupied by the cavity ports, the axial length of said restrictor portion being at least equal to the maximum axial length between adjacent cavity ports plus the width of a cavity port, the axial length of each of the cylindrical sealing portions being at least greater than the length of said recessed portion by an amount sufficient to insure sealing within the cylindrical cavity, these several portions being positioned along the length of the moveable regulator bar in the sequence, a cylindrical sealing portion, the recessed portion, the cylindrical restrictor portion, the second cylindrical sealing portion, the two cylindrical sealing portions being coaxial with the cylindrical restrictor portion, said moveable regulator bar being positioned within the cylindrical cavity of the fixed port housing and fitted with two axial motion stops, one of these axial motion stops being positioned on the moveable regulator bar so that when the bar is pushed against this stop the recessed portion aligns with that portion of the cylindrical cavity containing the cavity ports and all cavity ports are open, the other axial motion stop being positioned on the moveable regulator bar so that when the bar is pushed against this stop the recessed portion aligns and opens with only that pair of cavity ports which are coplanar and includes that one extra cavity port not connected to a pressure port, said moveable regulator bar being axially moveable to any position between the two positions set by the two axial motion stops via a torque control linkage connected to said moveable regulator bar, such axial motion closing off or opening up cavity ports to the cylindrical restrictor portion and the recessed portion of the moveable regulator bar;

the displacement volume of one full stroke of the dashpot, VD, the displacement volume of one full stroke of the free piston, VP, the total number of pressure fixed ports in the fixed port element, n, the revolutions per minute of the rotating port element, NR, the revolutions per minute of the engine, NE, are necessarily related to one another and to the minimum intake valve closing angle, AM, in crankshaft radians, according to the following equations;

$(VP)(n)(NR)(AM) = (6.283) (VD) (NE)$ $(VP)(n)(NR/NE)(AM) = (6.283) (VD)$ VD$)$ wherein the speed ratio, NR/NE, is determined by the positive drive mechanism driving the rotating port element from the engine shaft; and related to the maximum intake valve closing angle, AX, in crankshaft radians, according to the following equations;

$(VP)(NR/NE)(AX) = 6.283 (VD)$ $(VP) (n) (NR/NE) (AM) = 6.283 (VD)$ $(AX) = n(AM)$ wherein the minimun intake valve closing angle, AM, is at least as small as the intake valve closing angle in crankshaft radians of the intake cam on the engine camshaft, AC, and is preferably less than AC up to as small as one half of AC;

wherein the maximum intake valve closing angle, AX, is equal to the minimum intake valve closing angle, AM, plus 3 radians minus the maximum engine ignition spark advance in crankshaft radians before piston top dead center;

on multicylinder gasoline engines the several moveable regulator bars of the several fixed stroke, positive displacement, flow regulators being connected to the torque control linkage with equal cavity port opening.

2. The combination of a four stroke cycle gasoline engine, complete with engine intake valves, intake valve closing springs, intake valve operating cam and linkage, and additionally fitted with a dashpot connecting between each such engine intake valve and the frame of the engine, the two chambers of each such dashpot connecting together via an adjustable flow restrictor, wherein the improvement comprises connecting the two chambers of each such dashpot together also via a fixed stroke, positive displacement, flow regulator and disconnecting the engine torque control linkage from said adjustable flow restrictor;

said fixed stroke, positive displacement, flow regulator comprising a fixed port element, a rotating port element and drive, a free piston element, and a port regulator element with torque control linkage;

said fixed port element being secured to the engine frame and containing a cavity, within which the rotating port element rotates, and having two groups of fixed ports; one group of fixed ports, the pressure fixed ports, being connected individually to the port regulator element, whose other connection is via a portion of the control passage to that chamber of the dashpot whose volume is decreased when the engine intake valve closes, these pressure fixed ports connecting into the cavity in two sets of pressure fixed ports, each such set being coplanar in a plane at right angles to the axis of rotation of the rotating port element, the plane containing the one set of pressure fixed ports being displaced axially along said axis of rotation from the plane containing the other set of pressure fixed ports by the axial distance separating the two moving ports in the rotating port element as described hereinafter, the pressure fixed ports of each such set being equal angularly displaced relative to each other about said axis of rotation and such that each pressure fixed port of one set is coplanar with a pressure fixed port of the other set in a plane containing said axis of rotation and both these axially coplanar pressure fixed ports are on the same side of the axis of rotation, the number of such pressure fixed ports in each set of the two sets being an integral odd number; the other group of fixed ports, the discharge fixed ports, being connected together and jointly connecting via the other portion of the control passage to that chamber of the dashpot whose volume is increased when the engine intake valve closes, these discharge fixed ports connecting into the cavity in two sets of discharge fixed ports, each such set being coplanar in a plane at right angles to the axis of rotation of the rotating port element, these two planes containing these two sets of discharge fixed ports being coincident with the two planes containing the two sets of pressure fixed ports, the discharge fixed ports of each such set being equally angularly displaced relative to each other and also relative to the coplanar pressure fixed ports about said axis of rotation and such that each discharge fixed port of one set is coplanar with a discharge fixed port of the other set in a plane containing said axis of rotation and both of these axially coplanar discharge fixed ports are on the same side of the axis of rotation, the number of such discharge fixed ports in each set of the two sets being equal to the number of pressure fixed ports with which they are coplanar;

said rotating port element containing a cylindrical cavity for the free piston element and being fitted with two rotating ports connecting to each end of said cylindrical cavity, said rotating port element being positively rotated, within the cavity in the fixed port element, as by gears or chains, from an engine shaft such as the crankshaft or camshaft, said rotating port element being closely and sealably fitted to the cavity in the fixed port element; said two rotating ports being jointly coplanar with a plane containing the axis of rotation of the rotating port element and being on opposite sides of said axis of rotation, these two rotating ports being separated from one another along the axis of rotation a distance sufficient to seal them from one another and preferably about the length of the cylindrical cavity; said rotating port element being axially held in alignment within the cavity in the fixed port element so that one of the rotating ports indexes with and is coplanar with one of the sets of pressure fixed ports and also that set of discharge fixed ports which is coplanar therewith, and also so that the other rotating port indexes with and is coplanar with the other set of pressure fixed ports and also that other set of discharge fixed ports which is coplanar therewith;

said free piston element being a piston fitted closely but moveably within the cylindrical cavity in the rotating port element;

said port regulator element comprising a fixed port housing secured to the engine frame and a moveable regulator bar secured to the engine torque control linkage; said fixed port housing containing an open ended cylindrical cavity with cavity ports giving access to and distributed along a portion of the length of said cylindrical cavity, the number of such cavity ports being equal to one more than the number of pressure ports in the fixed port element and each such pressure port being connected individually to one such cavity port, the one extra cavity port not connected to a pressure port being connected via a portion of the control passage to that chamber of the dashpot whose volume is decreased when the engine intake valve closes and being coplanar with that one cavity port which does connect to a pressure port and is never closed by the moveable regulator bar in a plane at right angles to the centerline axis of the cylindrical cavity in the fixed port housing; said moveable regulator bar having two coaxial cylindrical sealing portions whose diameter fits closely, sealably and moveably into the cylindrical cavity in the fixed port housing, a recessed portion whose cross sectional area is less than the cross sectional area of the cylindrical sealing portions by at least the flow area of the cavity ports, a cylindrical restrictor portion whose diameter is smaller than the diameter of the cylindrical cavity by an amount sufficient to prevent sealing therebetween, the axial length of said recessed portion being at least equal to that length of the cylindrical cavity occupied by the cavity ports, the axial length of said restrictor portion being at least equal to the maximum axial length between adjacent cavity ports plus the width of a cavity port, the axial length of each of the cylindrical sealing portions being at least greater than the length of said recessed portion by an amount sufficient to insure sealing within the cylindrical cavity, these several portions being positioned along the length of the moveable regulator bar in the sequence, a cylindrical sealing portion, the recessed portion, the cylindrical restrictor portion, the second cylindrical sealing portion, the two cylindrical sealing portions being coaxial with the cylindrical restrictor portion, said moveable regulator bar being positioned within the cylindrical cavity of the fixed port housing and fitted with two axial motion stops, one of these axial motion stops being positioned on the moveable regulator bar so that when the bar is pushed against this stop the recessed portion aligns with that portion of the cylindrical cavity containing the cavity ports and all cavity ports are open, the other axial motion stop being positioned on the moveable regulator bar so that when the bar is pushed against this stop the recessed portion aligns and opens with only that pair of cavity ports which are coplanar and includes that one extra cavity port not connected to a pressure port, said moveable regulator bar being axially moveable to any position between the two positions set by the two axial motion stops via a torque control linkage connected to said moveable regulator bar, such axial motion closing off or opening up cavity ports to the cylindrical restrictor portion and the recessed portion of the moveable regulator bar;

the displacement volume of one full stroke of the dashpot, $VD$, the displacement volume of one full stroke of the free piston, $VP$, the total number of pressure fixed ports in the fixed port element, $n$, the revolutions per minute of the rotating port element, $NR$, the revolutions per minute of the engine, $NE$, are necessarily related to one another and to the minimum intake valve closing angle, $AM$, in crankshaft radians, according to the following equations;

$$(VP)(n)(NR)(AM) = (6.283)(VD)(NE)$$

$$(VP)(n)(NR/NE)(AM) = (6.283)(VD)$$

wherein the speed ratio, NR/NE, is determined by the positive drive mechanism driving the rotating port element from the engine shaft; and related to the maximum intake valve closing angle, $AX$, in crankshaft radians according to the following equations;

$$(VP)(NR/NE)(AX) = 6.283 VD$$

$$(VP)n(NR/NE)(Am) = 6.283 VD$$

$$(AX) = n(AM)$$

wherein the minimum intake valve closing angle, $AM$, is at least as small as the intake valve closing angle in crankshaft radians of the intake cam on the engine camshaft, $AC$, and is preferably less than $AC$ up to as small as one half of $AC$; wherein the maximum intake valve closing angle, $AX$, is equal to the minimum intake valve closing angle, $AM$, plus 3 radians minus the maximum engine ignition spark advance in crankshaft radians before piston top dead center;

on multicylinder gasoline engines the several moveable regulator bars of the several fixed stroke, positive displacement, flow regulators being connected to the torque control linkage with equal cavity port opening.

3. The combination of a four stroke cycle gasoline engine, complete with engine intake valves, intake valve closing springs, intake valve operating cams and linkage, and additionally fitted with a dashpot connecting between each such engine intake valve and the frame of the engine, wherein the improvement comprises connecting the two chambers of each such dashpot together via a fixed stroke, positive displacement flow regulator;

said fixed stroke, positive displacement, flow regulator comprising a fixed port element, a rotating port element and drive, a free piston element, and a port regulator element with torque control linkage;

said fixed port element being secured to the engine frame and containing a cavity, within which the rotating port element rotates, and having two groups of fixed ports; one group of fixed ports; the pressure fixed ports, being connected individually to the port regulator element whose other connection is via a portion of the control passage to one chamber of the dashpot, these pressure fixed ports connecting into the cavity in two sets of pressure fixed ports, each such set being coplanar in a plane at right angles to the axis of rotation of the rotating port element, the plane containing the one set of pressure fixed ports being displaced axially along said axis of rotation from the plane containing the other set of pressure fixed ports by a distance sufficient for sealing therebetween, the pressure fixed ports of each such set being angularly displaced relative to each other about said axis of rotation, the number of such pressure fixed ports in each set of the two sets being an integral odd number; the other group of fixed ports, the discharge fixed ports, being connected together and jointly connecting via the other portion of the control passage to the opposite chamber of the dashpot these discharge fixed ports connecting into the cavity in two sets of discharge fixed ports, each such set being coplanar in a plane at right angles to the axis of rotation of the rotating port element, these two planes containing these two sets of discharge fixed ports being coincident with the two planes containing the two sets of pressure fixed ports, the discharge fixed ports of each such set being angularly displaced relative to each other and each such discharge fixed port being displaced 180° from one of the coplanar pressure fixed ports about said axis of rotation, the number of such discharge fixed ports in each set of the two sets being equal to the number of pressure fixed ports with which they are coplanar, the pressure fixed ports of one coplanar set of pressure and discharge fixed ports being angularly displaced from the discharge fixed ports of the other coplanar set of pressure and discharge fixed ports by the displacement angle between the rotating ports as described hereinafter;

said rotating port element being positively rotated, within the cavity in the fixed port element, as by gears or chains, from an engine shaft such as the crankshaft or camshaft, said rotating port element being closely and sealably fitted to the cavity in the fixed port element; said rotating port element being fitted with two passages, each such passage being fitted with two ports at its ends, one such port of one such passage indexing with and being always coplanar with one set of coplanar pressure and discharge fixed ports in the fixed port element the other port of this same passage connecting always to one end of the free piston element as described hereinafter, one such port of the other passage indexing with and being always coplanar with the other set of coplanar pressure and discharge fixed ports in the fixed port element the other port of this latter passage connecting always to the other end of the free piston element, said two rotating ports which index with and are coplanar with the pressure and discharge fixed ports being angularly displaced from one another about the axis of rotation of the rotating port element by the displacement angle which can have any value between zero and 180°; said rotating port element being axially held in alignment within the cavity in the fixed port element so that the rotating ports index with and remain coplanar with the sets of pressure fixed ports and discharge fixed ports;

said free piston element being a free piston and closed ended cylinder with the free piston fitted closely and moveably within the cylinder and being free to move within said cylinder, one end of said cylinder connecting always into one passage in the rotating port element and the other end of said cylinder connecting always into the other passage in the rotating port element; the ends of said cylinder being closed;

said port regulator element comprising a fixed port housing secured to the engine frame and a moveable regulator bar secured to the engine torque control linkage; said fixed port housing containing an open ended cylindrical cavity with cavity ports giving access to and distributed along a portion of the length of said cylindrical cavity, the number of such cavity ports being equal to one more than the number of pressure ports in the fixed port element and each such pressure port being connected individually to one such cavity port, the one extra cavity port not connected to a pressure port being connected via a portion of the control passage to one chamber of the dashpot and being coplanar with that one cavity port which does connect to a pressure port and is never closed by the moveable regulator bar in a plane at right angles to the centerline axis of the cylindrical cavity in the fixed port housing; said moveable regulator bar fitting closely, sealably and axially moveably within the cylindrical cavity in the fixed port housing and having two axial motion stops and a tapered recessed portion of its length between seals, the length of said tapered recessed portion being somewhat longer than the length of that portion of the cylindrical cavity containing the cavity ports, one of the axial motion stops being positioned on the moveable regulator bar so that when the bar is pushed against this stop the tapered recessed portion aligns with that portion of the cylindrical cavity containing the cavity ports and all cavity ports are open, the other axial motion stop being positioned on the moveable regulator bar so that when the bar is pushed against this stop the tapered recessed portion aligns and opens only with that pair of cavity ports which are coplanar and includes the one extra cavity port not connected to a pressure port, said moveable regulator bar being axially moveable to any position between the two positions set by the two axial motion stops via a torque control linkage connected to said moveable regulator bar, such axial motion closing off or opening up cavity ports to the tapered recessed portion of the moveable regulator bar;

the displacement volume of one full stroke of the dashpot, $VD$, the displacement volume of one full stroke of the free piston, $VP$, the total number of pressure fixed ports in the fixed port element, $n$, the revolutions per minute of the rotating port element, $NR$, the revolutions per minute of the engine, $NE$, are necessarily related to one another and to the minimum intake valve closing angle, $AM$, in crankshaft radians, according to the following equations;

$$(VP)(n)(NR)(AM) = (6.283)(VD)(NE)$$

$$(VP)(n)(NR/NE)(AM) = (6.283)(VD)$$

wherein the speed ratio, $NR/NE$, is determined by the positive drive mechanism driving the rotating port element from the engine shaft; and related to the maximum intake valve closing angle, $AX$, in crankshaft radians, according to the following equations;

$$(VP)(NR/NE)(AX) = 6.283\ VD$$

$$(VP)n(NR/NE)(AM) = 6.283\ VD$$

$$(AX)(AX) = n(AM)$$

wherein the minimum intake valve closing angle, $AM$, is at least as small as the intake valve closing angle in crankshaft radians of the intake cam on the engine camshaft, $AC$, and is preferably less than $AC$ up to as small as one half of $AC$; wherein the maximum intake valve closing angle, $AX$, is equal to the minimum intake valve closing angle, $AM$, plus 3 radians minus the maximum engine ignition spark advance in crankshaft radians before piston top dead center;

on multicylinder gasoline engines the several moveable regulator bars of the several fixed stroke, positive displacement, flow regulators being connected to the torque control linkage with equal cavity port opening.

4. The combination of a four stroke cycle gasoline engine, complete with engine intake valves, intake valve closing springs, intake valve operating cams and linkage, and additionally fitted with a dashpot connecting between each such engine intake valve and the frame of the engine, the two chambers of each such dashpot connecting together via an adjustable flow restrictor, wherein the improvement comprises connecting the two chambers of each such dashpot together also via a fixed stroke, positive displacement, flow regulator and disconnecting the engine torque control linkage from said adjustable flow restrictor;

said fixed stroke, positive displacement, flow regulator comprising a fixed port element, a rotating port element and drive a free piston element, and a port regulator element with torque control linkage;

said fixed port element being secured to the engine frame and containing a cavity, within which the rotating port element rotates, and having two groups of fixed ports; one group of fixed ports, the pressure fixed ports, being connected individually to the port regulator element, whose other connection is via a portion of the control passage to one chamber of the dashpot, these pressure fixed ports connecting into the cavity in two sets of pressure fixed ports, each such set being coplanar in a plane at right angles to the axis of rotation of the rotating port element, the plane containing the one set of pressure fixed ports being displaced axially along said axis of rotation from the plane containing the other set of pressure fixed ports by a distance sufficient for sealing therebetween, the pressure fixed ports of each such set being angularly displaced relative to each other about said axis of rotation, the number of such pressure fixed ports in each set of the two sets being an integral odd number; the other group of fixed ports, the discharge fixed ports, being connected together and jointly connecting via the other portion of the control passage to the opposite chamber of the dashpot, these discharge fixed ports connecting into the cavity in two sets of discharge fixed ports, each such set being coplanar in a plane at right angles of the axis of rotation of the rotating port element, these two planes containing these two sets of discharge fixed ports being coincident with the two planes containing the two sets of pressure fixed ports, the discharge fixed ports of each such set being angularly displaced relative to each other and each such discharge fixed port being displaced 180° from one of the coplanar pressure fixed ports about said axis of rotation, the number of such discharge fixed ports in each set of the two sets being equal to the number of pressure fixed ports with which they are coplanar, the pressure fixed ports of one coplanar set of pressure and discharge fixed ports being angularly displaced from the discharge fixed ports of the other coplanar set of pressure and discharge fixed ports by the displacement angle between the rotating ports as described hereinafter;

said rotating port element being positively rotated, within the cavity in the fixed port element, as by gears or chains, from an engine shaft such as the crankshaft or camshaft, said rotating port element being closely and sealably fitted to the cavity in the fixed port element; said rotating port element being fitted with two passages, each such passage being fitted with two ports at its ends, one such port of one such passage indexing with and being always coplanar with one set of coplanar pressure and discharge fixed ports in the fixed port element the other port of this same passage connecting always to one end of the free piston element as described hereinafter, one such port of the other passage indexing with and being always coplanar with the other set of coplanar pressure and discharge fixed ports in the fixed port element the other port of this latter passage connecting always to the other end of the free piston element, said two rotating ports which index with and are coplanar with the pressure and discharge fixed ports being angularly displaced one from another about the axis of rotation of the rotating port element by the displacement angle which can have any value between zero and 180°; said rotating port element being axially held in alignment within the cavity in the fixed port element so that the rotating ports index with and remain coplanar with the sets of pressure fixed ports and discharge fixed ports;

said free piston element being a free piston and closed ended cylinder with the free piston fitted closely and moveably within the cylinder and being free to move within said cylinder, one end of said cylinder connecting always into one passage in the rotating port element and the other end of said cylinder connecting always into the other passage in the rotating port element, the ends of said cylinder being closed;

said port regulator element comprising a fixed port housing secured to the engine frame and a moveable regulator bar secured to the engine torque control linkage; said fixed port housing containing an open ended cylindrical cavity with cavity ports giving access to and distributed along a portion of the length of said cylindrical cavity, the number of such cavity ports being equal to one more than the number of pressure ports in the fixed port element and each such pressure port being connected individually to one such cavity port, the one extra cavity port not connected to a pressure port being connected via a portion of the control passage to one chamber of the dashpot and being coplanar with that one cavity port which does connect to a pressure port and is never closed by the moveable regulator bar in a plane at right angles to the centerline axis of the cylindrical cavity in the fixed port housing; said moveable regulator bar fitting closely, sealably and axially moveably within the cylindrical cavity in the fixed port housing and having two axial motion stops and a tapered recessed portion of its length between seals, the length of said tapered recessed portion being somewhat longer than the length of that portion of the cylindrical cavity containing the cavity ports, one of the axial motion stops being positioned on the moveable regulator bar so that when the bar is pushed against this stop the tapered recessed portion aligns with that portion of the cylindrical cavity containing the cavity ports and all cavity ports are open, the other axial motion stop being positioned on the moveable regulator bar so that when the bar is pushed against this stop the tapered recessed portion aligns and opens only with that pair of cavity ports which are coplanar and includes the one extra cavity port not connected to a pressure port, said moveable regulator bar being axially moveable to any position between the two positions set by the two axial motion stops via a torque control linkage connected to said moveable regulator bar, such axial motion closing off or opening up cavity ports to the tapered recessed portion of the moveable regulator bar;

the displacement volume of one full stroke of the dashpot, $VD$, the displacement volume of one full stroke of the free piston, $VP$, the total number of pressure fixed ports in the fixed port element, $n$, the revolutions per minute of the rotating port element, $NR$, the revolutions per minute of the engine, $NE$, are necessarily related to one another and to the minimum intake valve closing angle, $AM$, in crankshaft radians, according to the following equations;

$(VP)(n)(NR)(AM) = (6.283)(VD)(NE)$ $(VP)(n)(NR/NE)(AM) = (6.283)(VD)$ wherein the speed ratio, $NR/NE$, is determined by the positive drive mechanism driving the rotating port element from the engine shaft; and related to the maximum intake valve closing angle, $AX$, in crankshaft radians, according to the following equations;

$(VP)(NR/NE)(AX) = 6.283VD$ $(VP)n(NR/NE)(AM) = 6.283VD$ $(AX) = n(AM)$ wherein the minimum intake valve closing angle, $AM$, is at least as small as the intake valve closing angle in crankshaft radians of the intake cam on the engine camshaft, $AC$, and is preferably less than $AC$ up to as small as one half of $AC$; wherein the maximum intake valve closing angle, $AX$, is equal to the minimum intake valve closing angle, $AM$, plus 3 radians minus the maximum engine ignition spark advance in crankshaft radians before piston top dead center;

on multicylinder gasoline engines the several moveable regulator bars of the several fixed stroke, positive displacement, flow regulators being connected to the torque control linkage with equal cavity port opening.

* * * * *